United States Patent
Hua (10) Patent No.: US 11,474,901 B2
(45) Date of Patent: Oct. 18, 2022

(54) RELIABLE RAID SYSTEM WITH EMBEDDED SPARE CAPACITY AND FLEXIBLE GROWTH

(71) Applicant: EMC IP HOLDING COMPANY LLC, Hopkinton, MA (US)

(72) Inventor: Kuolin Hua, Natick, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 248 days.

(21) Appl. No.: 17/009,818

(22) Filed: Sep. 2, 2020

(65) Prior Publication Data

US 2022/0066878 A1 Mar. 3, 2022

(51) Int. Cl.
*G06F 11/08* (2006.01)
*G06F 11/10* (2006.01)
*G06F 11/07* (2006.01)
*G06F 3/06* (2006.01)

(52) U.S. Cl.
CPC ........ *G06F 11/1076* (2013.01); *G06F 3/0619* (2013.01); *G06F 3/0644* (2013.01); *G06F 3/0659* (2013.01); *G06F 3/0689* (2013.01); *G06F 11/0727* (2013.01)

(58) Field of Classification Search
CPC ........................... G06F 11/1076; G06F 3/0619
USPC ................................................ 714/6.22, 6.24
See application file for complete search history.

(56) References Cited

U.S. PATENT DOCUMENTS

| 10,430,279 | B1* | 10/2019 | Dittia | G06F 3/0656 |
| 11,327,668 | B1* | 5/2022 | Hua | G06F 3/0653 |
| 2007/0143542 | A1* | 6/2007 | Watanabe | G06F 1/3268 711/114 |
| 2008/0065970 | A1* | 3/2008 | Tan | G11B 20/1833 714/800 |

* cited by examiner

*Primary Examiner* — Chae M Ko
(74) *Attorney, Agent, or Firm* — Anderson Gorecki LLP (57) ABSTRACT

A subset of drives with protection groups that have D data members and P parity members is created with (D+P+1) drives each having (D+P) partitions. One of the protection groups is used for spare capacity. (D+P) sequentially numbered protection groups are created by distributing protection group members such that members of protection group (X+Y) modulo (D+P+1) are located on the partition at drive X of partition Y. Alternatively, members of protection group (X−Y) modulo (D+P+1) are located on the partition at drive X of partition Y. New drives are added in single drive increments. When a new drive is added the first (D+P) protection group members of the lowest numbered unrotated partition of the (D+P) lowest numbered drives are rotated onto the new drive. Members are rotated in ascending order by drive to locations in ascending order by partition. A new protection group is created in the partitions made available due to rotation. When there are enough drives in the drive subset to enable a split, then the drive subset is split into two drive subsets, e.g. a first drive subset of (D+P) drives and a second drive subset of (D+P+1) drives.

20 Claims, 13 Drawing Sheets

| drive\part | 0 | 1 | 2 | 3 |
|---|---|---|---|---|
| 0 | 0 | 1 | 2 | 3 |
| 1 | 1 | 2 | 3 | 4 |
| 2 | 2 | 3 | 4 | 0 |
| 3 | 3 | 4 | 0 | 1 |
| 4 | 4 | 0 | 1 | 2 |

Figure 4

| drive\part | 0 | 1 | 2 | 3 |
|---|---|---|---|---|
| 0 | 0 | 1 | 2 | 3 |
| ~~1~~ | 1 | 2 | 3 | 4 |
| 2 | 2 | 3 | 4 | 0 |
| 3 | 3 | 4 | 0 | 1 |
| 4 | 4 | 0 | 1 | 2 |

Figure 5A

| drive\part | 0 | 1 | 2 | 3 |
|---|---|---|---|---|
| 0 | 4 | 1 | 2 | 3 |
| ~~1~~ | X | X | X | X |
| 2 | 2 | 3 | 4 | 1 |
| 3 | 3 | 4 | 2 | 1 |
| 4 | 4 | 3 | 1 | 2 |

Figure 5B

| drive\part | 0 | 1 | 2 | 3 |
|---|---|---|---|---|
| 0 | 0 | 1 | 2 | 3 |
| 1 | 1 | 2 | 3 | 4 |
| 2 | 2 | 3 | 4 | 0 |
| 3 | 3 | 4 | 0 | 1 |
| 4 | 4 | 0 | 1 | 2 |
| 5 |  |  |  |  |

Figure 6A

| drive\part | 0 | 1 | 2 | 3 |
|---|---|---|---|---|
| 0 | 5 | 1 | 2 | 3 |
| 1 | 5 | 2 | 3 | 4 |
| 2 | 5 | 3 | 4 | 0 |
| 3 | 5 | 4 | 0 | 1 |
| 4 | 4 | 0 | 1 | 2 |
| 5 | 0 | 1 | 2 | 3 |

Figure 6B

| drive\part | 0 | 1 | 2 | 3 |
|---|---|---|---|---|
| 0 | 5 | 1 | 2 | 3 |
| ~~1~~ | 5 | 2 | 3 | 4 |
| 2 | 5 | 3 | 4 | 0 |
| 3 | 5 | 4 | 0 | 1 |
| 4 | 4 | 0 | 1 | 2 |
| 5 | 0 | 1 | 2 | 3 |

Figure 7A

| drive\part | 0 | 1 | 2 | 3 |
|---|---|---|---|---|
| 0 | 5 | 1 | 2 | 3 |
| ~~1~~ | X | X | X | X |
| 2 | 5 | 3 | 4 | 2 |
| 3 | 5 | 4 | 3 | 1 |
| 4 | 4 | 5 | 1 | 2 |
| 5 | 4 | 1 | 2 | 3 |

Figure 7B

| drive\part | 0 | 1 | 2 | 3 |
|---|---|---|---|---|
| 0 | 5 | 1 | 2 | 3 |
| 1 | 5 | 2 | 3 | 4 |
| 2 | 5 | 3 | 4 | 0 |
| 3 | 5 | 4 | 0 | 1 |
| 4 | 4 | 0 | 1 | 2 |
| 5 | 0 | 1 | 2 | 3 |
| 6 |   |   |   |   |

Figure 8A

| drive\part | 0 | 1 | 2 | 3 |
|---|---|---|---|---|
| 0 | 5 | 6 | 2 | 3 |
| 1 | 5 | 6 | 3 | 4 |
| 2 | 5 | 6 | 4 | 0 |
| 3 | 5 | 6 | 0 | 1 |
| 4 | 4 | 0 | 1 | 2 |
| 5 | 0 | 1 | 2 | 3 |
| 6 | 1 | 2 | 3 | 4 |

| drive\part | 0 | 1 | 2 | 3 |
|---|---|---|---|---|
| 0 | 5 | 6 | 2 | 3 |
| 1 | 5 | 6 | 3 | 4 |
| 2 | 5 | 6 | 4 | 0 |
| 3 | 5 | 6 | 0 | 1 |
| 4 | 4 | 0 | 1 | 2 |
| 5 | 0 | 1 | 2 | 3 |
| 6 | 1 | 2 | 3 | 4 |
| 7 |   |   |   |   |

Figure 9B

| drive\part | 0 | 1 | 2 | 3 |
|---|---|---|---|---|
| 0 | 5 | 6 | 7 | 3 |
| 1 | 5 | 6 | 7 | 4 |
| 2 | 5 | 6 | 7 | 0 |
| 3 | 5 | 6 | 7 | 1 |
| 4 | 4 | 0 | 1 | 2 |
| 5 | 0 | 1 | 2 | 3 |
| 6 | 1 | 2 | 3 | 4 |
| 7 | 2 | 3 | 4 | 0 |

| drive\part | 0 | 1 | 2 | 3 |
|---|---|---|---|---|
| 0 | 5 | 6 | 7 | 8 |
| 1 | 5 | 6 | 7 | 8 |
| 2 | 5 | 6 | 7 | 8 |
| 3 | 5 | 6 | 7 | 8 |
| 4 | 4 | 0 | 1 | 2 |
| 5 | 0 | 1 | 2 | 3 |
| 6 | 1 | 2 | 3 | 4 |
| 7 | 2 | 3 | 4 | 0 |
| 8 | 3 | 4 | 0 | 1 |

Figure 10

| drive\part | 0 | 1 | 2 | 3 |
|---|---|---|---|---|
| 0 | 5 | 6 | 7 | 8 |
| ~~1~~ | 5 | 6 | 7 | 8 |
| 2 | 5 | 6 | 7 | 8 |
| 3 | 5 | 6 | 7 | 8 |
| 4 | 4 | 0 | 1 | 2 |
| 5 | 0 | 1 | 2 | 3 |
| 6 | 1 | 2 | 3 | 4 |
| 7 | 2 | 3 | 4 | 0 |
| 8 | 3 | 4 | 0 | 1 |

Figure 11

| drive\part | 0 | 1 | 2 | 3 |
|---|---|---|---|---|
| 0 | 5 | 6 | 7 | 8 |
| 1 | 5 | 6 | 7 | 8 |
| 2 | 5 | 6 | 7 | 8 |
| 3 | 5 | 6 | 7 | 8 |

New Drive
Subset 350

| drive\part | 0 | 1 | 2 | 3 |
|---|---|---|---|---|
| 0 | 4 | 0 | 1 | 2 |
| 1 | 0 | 1 | 2 | 3 |
| 2 | 1 | 2 | 3 | 4 |
| 3 | 2 | 3 | 4 | 0 |
| 4 | 3 | 4 | 0 | 1 |

New Drive
Subset 352

RELIABLE RAID SYSTEM WITH EMBEDDED SPARE CAPACITY AND FLEXIBLE GROWTH

TECHNICAL FIELD

The subject matter of this disclosure is generally related to electronic data storage and more particularly to providing protection groups on drive subsets with sparing, scaling, and splitting capabilities.

BACKGROUND

Protection groups help to avoid data loss by enabling a failing or failed protection group member to be reconstructed. Individual disk drives are protection group members in a typical data storage system, e.g. members of a redundant array of independent drives (RAID) protection group. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A failed protection group member is typically reconstructed on a spare drive.

It is sometimes necessary to increase the total storage capacity of a data storage system. For example, storage capacity may be increased when existing storage capacity becomes fully utilized. The storage capacity of a data storage system that uses individual drives as protection group members is increased by adding a new protection group, i.e. (D+P) drives for a RAID (D+P) protection group. A storage system that implements RAID-5 (4+1), for example, may be scaled-up in increments of five new drives. Similarly, a RAID-5 (3+1) may be scaled-up in increments of four new drives. One drawback of scaling storage capacity in increments of (D+P) new drives is that it may introduce excess storage capacity that will not be utilized within a reasonable timeframe. This drawback is becoming more troublesome as the storage capacity of individual drives increases due to technological advancements. More specifically, as the storage capacity and cost of drives increases, the amount of excess storage capacity and cost associated with adding D+P drives to a storage system also increases, particularly for larger values of (D+P).

SUMMARY

All examples, aspects and features mentioned in this document can be combined in any technically possible way.

In accordance with some implementations a method comprises: creating (D+P) partitions that are equal in size and number on (D+P+1) drives; creating protection groups that have D data members and P parity members by symmetrically distributing the protection group members on the partitions using modulo arithmetic; individually adding new drives with (D+P) partitions equal in size and number to the partitions of the (D+P) drives; for the first new drive: selecting (D+P) protection group members located on the first partition of the (D+P) drives; rotating the selected members (as a column of a matrix) to the new drive (as a new row of the matrix); and creating a new protection group using freed space of the rotated members; and for each of the next new drives: selecting (D+P) protection group members located on an unrotated partition of the (D+P) drives; rotating the selected protection group members to the new drive; and creating a new protection group using partitions freed by rotating the selected protection group members to the new drive.

In accordance with some implementations an apparatus comprises: a plurality of non-volatile drives; a plurality of interconnected compute nodes that manage access to the drives; and a drive manager configured to: create (D+P) partitions that are equal in size and number on (D+P+1) drives; create protection groups that have D data members and P parity members by symmetrically distributing the protection group members on the partitions using modulo arithmetic; individually add new drives with (D+P) partitions equal in size and number to the partitions of the (D+P) drives; for each of the new drives: select (D+P) protection group members located on an unrotated partition of the (D+P) drives; rotate the (D+P) selected protection group members from the unrotated partition to the new drive; and create a new protection group using partitions freed by rotating the selected protection group members to the new drive.

A computer-readable storage medium in accordance with some implementations stores instructions that when executed by a computer cause the computer to perform a method for using a computer system to scale a subset of drives, the method comprising: creating (D+P) partitions that are equal in size and number on (D+P+1) drives; creating protection groups that have D data members and P parity members by symmetrically distributing the protection group members on the partitions using modulo arithmetic; individually adding new drives with (D+P) partitions equal in size and number to the partitions of the (D+P) drives; for each of the new drives: selecting (D+P) protection group members located on an unrotated partition of the (D+P) drives; rotating the (D+P) selected protection group members from the unrotated partition to the new drive; and creating a new protection group using partitions freed by rotating the selected protection group members to the new drive.

Symmetrically distributing protection group members using modulo arithmetic and rotating selected protection group members to a new drive facilitates sparing, scaling, and splitting. A protection group that is distributed using modulo arithmetic and used for spare capacity provides at least one failover solution for which no more than one member of a protection group is rebuilt on a single drive. Further, the storage capacity of a drive subset for which protection group members are symmetrically distributed using modulo arithmetic and rotated onto a new drive helps to enable scaling up storage capacity in single drive increments rather than being limited to increments of (D+P) drives. Further, when the drive subset has been scaled to 2*(D+P)+1 drives it can be split into a first drive subset of (D+P) drives and a second drive subset of (D+P+1) drives and the (D+P+1) drives are ready for scaling because symmetry is preserved by rotation. Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
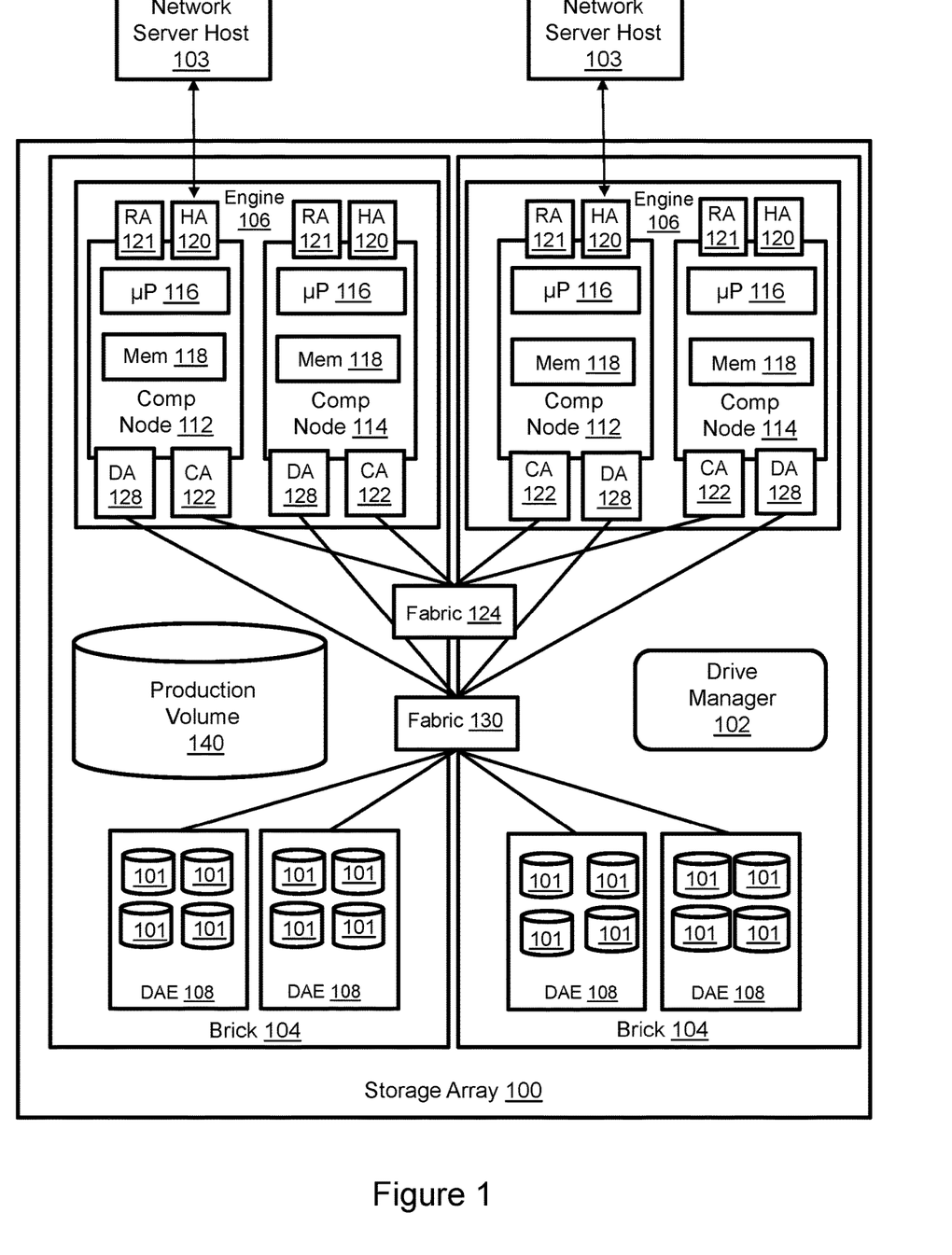
FIG. 1 illustrates a storage array with a drive manager that implements protection groups on drive subsets with sparing, scaling, and splitting capabilities.

FIG. 1 illustrates a storage array 100 with a drive manager 102 that implements protection groups on drive subsets with sparing, scaling, and splitting capabilities. Each drive subset managed by the drive manager is scalable in single drive increments and can be split into multiple drive subsets when enough drives have been added. The storage array is one example of a storage area network (SAN), which is one example of a data storage system in which the drive manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with the hosted application instances running on the hosts 103 is maintained on the managed drives 101. The managed drives 101 are not discoverable by the hosts but the storage array creates a logical storage device referred to herein as a production volume 140 that can be discovered and accessed by the hosts. Without limitation, the production volume may also be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the production volume 140 and the managed drives 101 in order to process IOs from the hosts.

Figure 2:
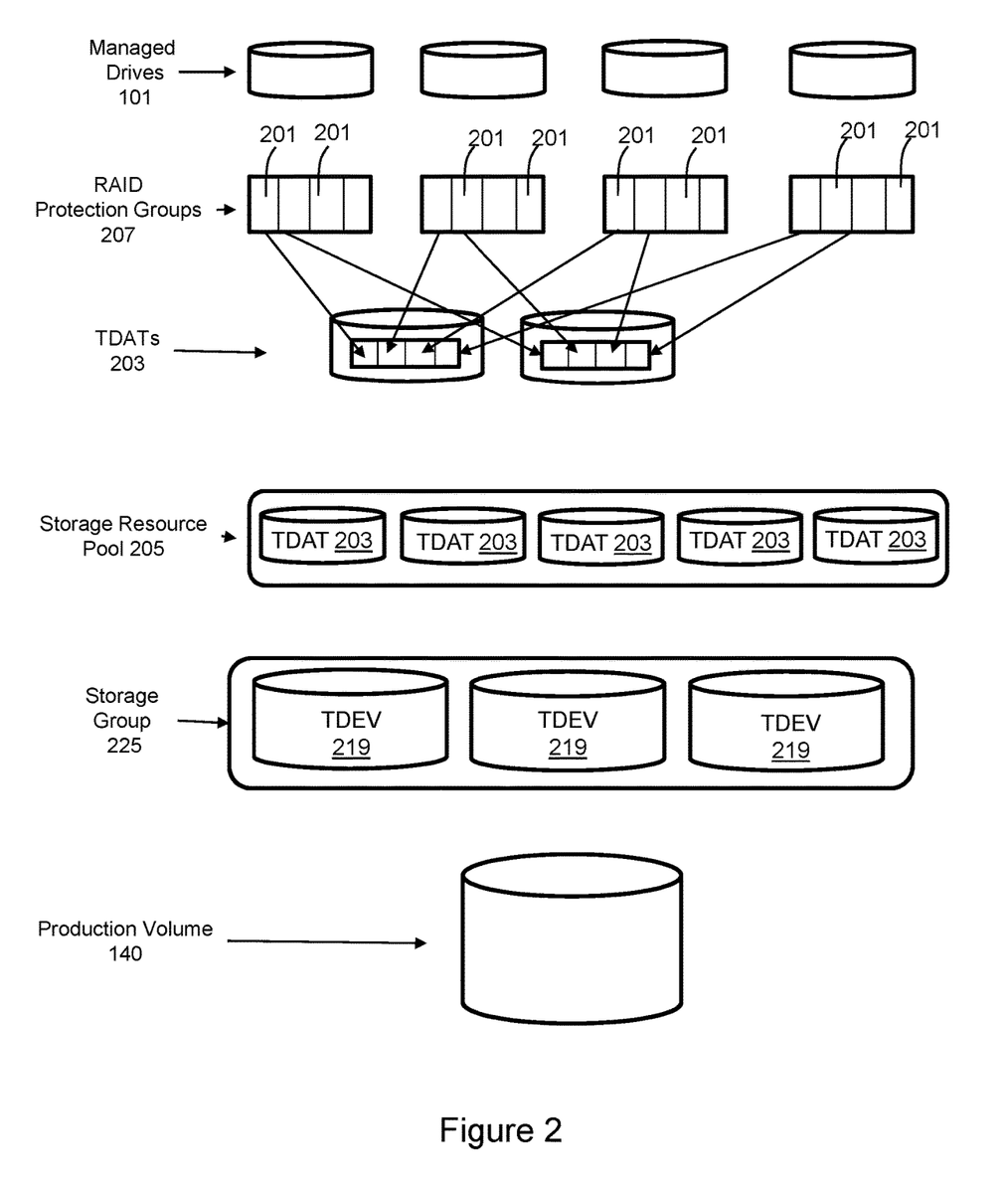
FIG. 2 illustrates layers of abstraction between the managed drives and the production volume of the storage array of FIG. 1.

FIG. 2 illustrates layers of abstraction between the managed drives 101 and the production volume 140. The smallest unit of storage capacity that can be processed by a managed drive 101 is a sector. Different types of managed drives may be characterized by different sector sizes but for context and without limitation the sector size of all managed drives may be 2 KB. IOs between the compute nodes and the managed drives may be in larger allocation units such as 128 KB tracks that are a fixed size that may be an integer multiple of the sector size. For example, an IO may read or write the sectors of a track. The managed drives 101 are each organized into partitions 201 of equal storage capacity, i.e. every partition has the same fixed size. Selection of partition storage capacity is a design implementation and, for context and without limitation, may be some fraction or percentage of the capacity of a managed drive equal to an integer multiple of sectors greater than 1. Each partition may include a contiguous range of logical addresses. Groups of partitions that include partitions from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-5. In some implementations all TDATs in a drive group are of a single RAID protection group type and all have the same size (storage capacity). Logical thin devices (TDEVs) 219 are created using TDATs. The TDATs and TDEVs are accessed using tracks as the allocation unit. Multiple TDEVs 219 are organized into a storage group 225. The production volume 140 is created from a single storage group 225. Host application data, which is stored in blocks on the production volume 140, is mapped to tracks of the TDEVs, which map to sectors of the managed drives. Regardless of the specific allocation unit capacities selected, a track is larger than both the sectors and the fixed size blocks used in communications between the storage array and the hosts to access the production volume.

Figure 3:
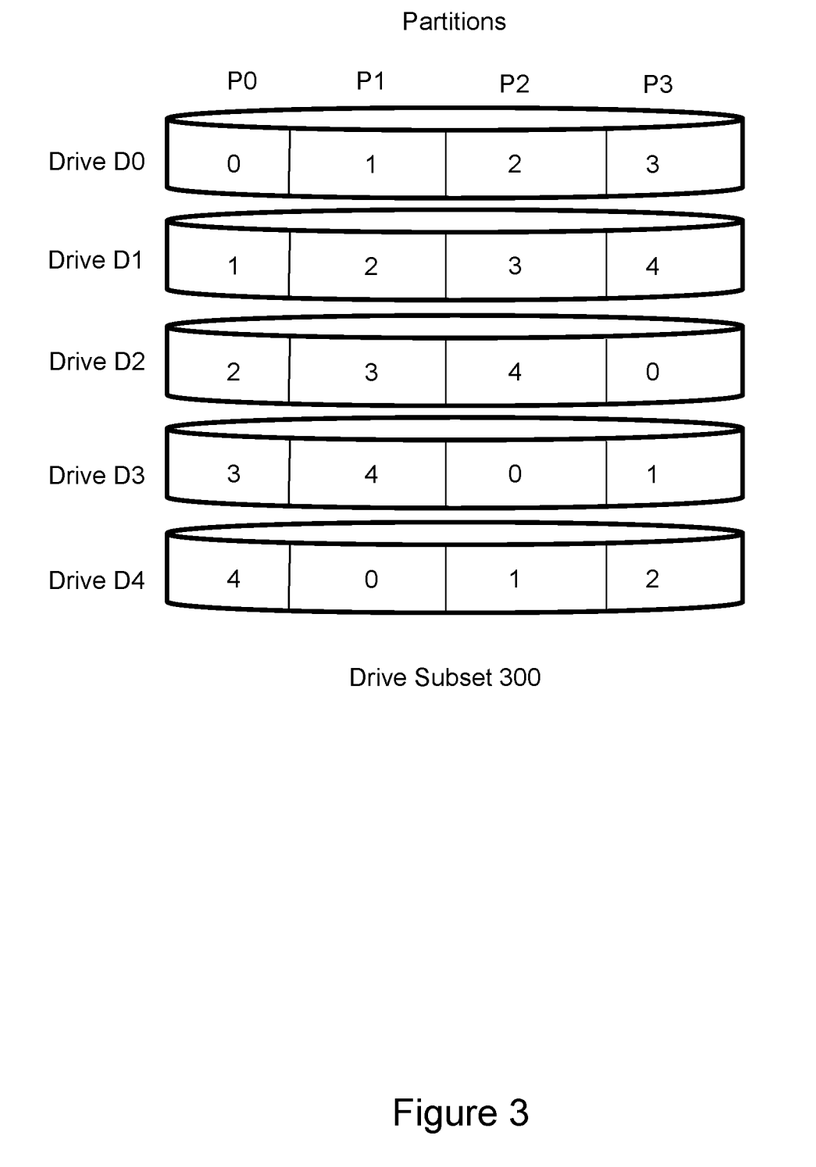
FIG. 3 illustrates an implementation of RAID (D+P) protections groups on partitions of a subset of the managed drives.

FIG. 3 illustrates an implementation of RAID (D+P) protections groups on a subset 300 of the managed drives 101 (FIG. 1). The storage array includes multiple drive subsets, each of which is created with (D+P) or (D+P+1) drives and (D+P) partitions. Using (D+P+1) drives provides spare capacity for use in response to drive failure. RAID (3+1) is implemented in the illustrated example and the drive subset includes (D+P+1) drives so there are five drives D0-D4 and four partitions P0-P3. For purposes of explanation all of the drives have the same storage capacity and all of the partitions have the same fixed size in terms of storage capacity. Protection groups members are located in the drive partitions such that no more than one member of a protection group is located on the same drive. Protection group 0 is reserved as spare capacity. Protections groups 1-4 represent data and/or parity members.

Figure 4:
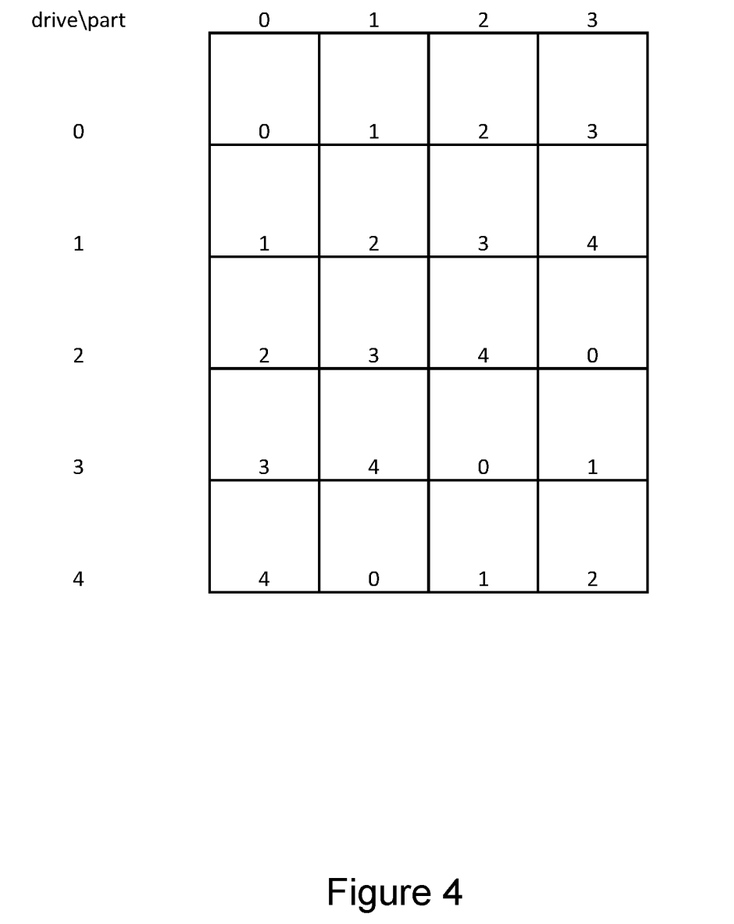
FIG. 4 is a matrix representation of the drive subset of FIG. 3.

FIG. 4 is a matrix representation of the drive subset of FIG. 3. Rows in the matrix represent drives and columns in the matrix represent partitions. The protection group members are symmetrically distributed on the partitions using modulo arithmetic to facilitate sparing, scaling, and splitting capabilities. In the illustrated example the members of protection group (X+Y) modulo (D+P+1) are located on the partition at drive/row X of partition/column Y. For example, a member of protection group (0+0) modulo (3+1+1)=0 is located at drive/row 0 of partition/column 0. Alternatively, members of protection group (X−Y) modulo (D+P+1) are located on the partition at drive/row X of partition/column Y. In contrast, it is typical in previous designs for protection group members to be located on single partitions and all spare capacity to be on a spare drive.

Figure 5A:
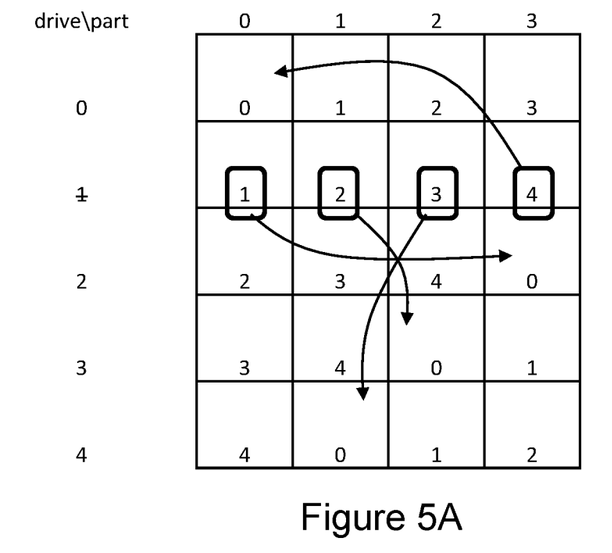
FIGS. 5A and 5B illustrate use of spare partitions in response to drive failure in the drive subset represented by FIG. 4.
Figure 5B:
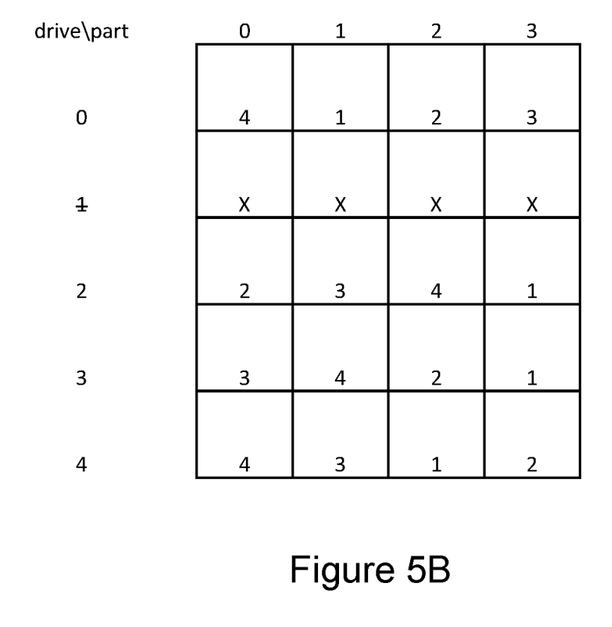

FIGS. 5A and 5B illustrate use of spare partitions (protection group 0) in response to drive failure in the drive subset configuration shown in FIG. 4. In the illustrated example drive 1 fails or is failing so the four protection group 0 members on partitions 0-3 of drive 1 must be relocated or rebuilt. The protection group members are relocated or rebuilt in the spare partitions such that no more than one member of a protection group is located on the same drive. The use of modulo arithmetic to distribute the protection group members and spares assures that at least one solution is available such no more than one member of a protection group is located on the same drive. If multiple solutions are available, then any one of those solutions may be implemented. In the illustrated example the member of protection group 1 at partition 0 of drive 1 is relocated or rebuilt in partition 3 of drive 2, the member of protection group 2 at partition 1 of drive 1 is relocated or rebuilt in partition 2 of drive 3, the member of protection group 3 at partition 2 of drive 1 is relocated or rebuilt in partition 1 of drive 4, and the member of protection group 4 at partition 3 of drive 1 is relocated or rebuilt in partition 0 of drive 0. The failed drive is removed from service and may eventually be replaced.

Figure 6A:
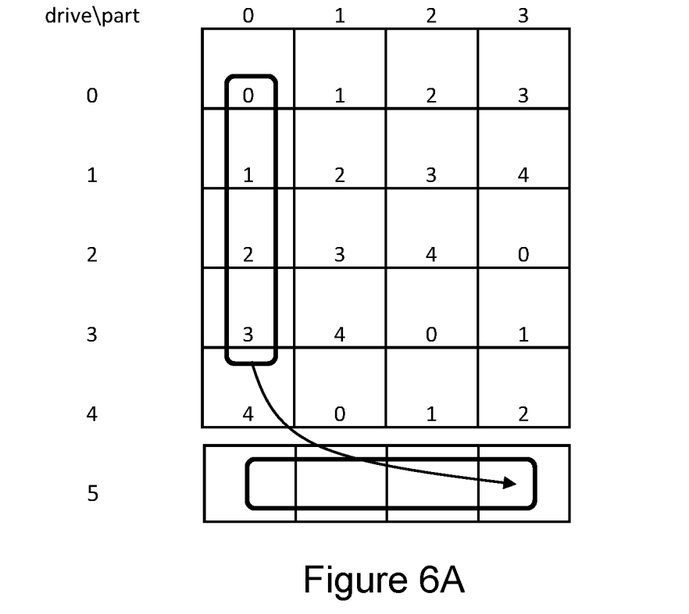
FIG. 6A illustrates selection and movement of protection group members to a first new drive added to the drive subset represented by FIG. 4.

FIG. 6A illustrates selection and movement of protection group members to a first new drive added to the drive subset represented by FIG. 4. The first new drive is sequentially numbered relative to existing drives 0-4 and is thus drive 5. The new drive is formatted with the same number and size partitions as the existing drives and thus has (D+P) partitions numbered 0-3. A new drive is populated by rotating (D+P) protection group members in the lowest numbered unrotated partition/column from the first (D+P) drives/rows in ascending order to the (D+P) partitions of the new drive in ascending order. Consequently, the protection group member of the first drive/row is moved to the first partition/column of the new drive, the protection group member of the second drive/row is moved to the second partition/column of the new drive, the protection group member of the third drive/row is moved to the third partition/column of the new drive, and so forth. In the illustrated example none of the partitions have been rotated so partition 0 is selected and protection group member 0 is moved from drive 0, partition 0 to drive 5, partition 0, then protection group member 1 is moved from drive 1, partition 1 to drive 5, partition 1, then protection group member 2 is moved from drive 1, partition 2 to drive 5, partition 2, then protection group member 3 is moved from drive 1, partition 3 to drive 5, partition 3.

Figure 6B:
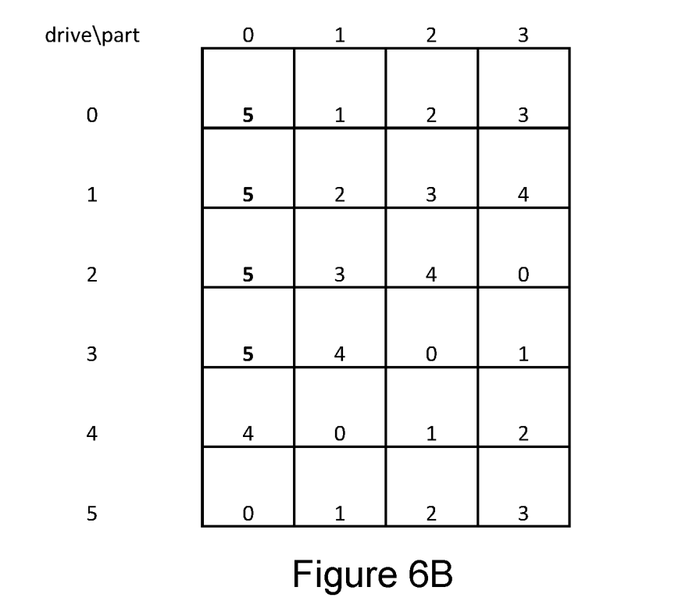
FIG. 6B illustrates creation of a new protection group using the partitions freed by movement of existing protection group members to the first new drive as shown in FIG. 6A.

FIG. 6B illustrates creation of a new protection group using the partitions freed by rotation of the selected protection group members to the first new drive as shown in FIG. 6A. The new protection group is sequentially numbered relative to the existing protection groups and includes the same number of members, i.e. (D+P). In the illustrated example the new protection group is assigned the number 5 and the members of protection group 5 are located in partition 0 of drives 0-3 which were made available by the rotation of protection group members 0, 1, 2, 3 to partitions 0-3 of new drive 5 as described in the preceding paragraph. Partition 0 is considered at this point to have been rotated so the next lowest numbered partition, i.e. partition 1, will be selected for rotation when a second new drive is added.

Figure 7A:
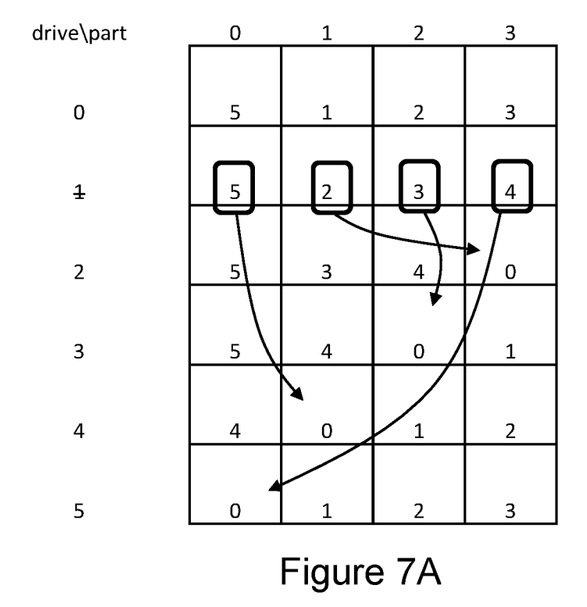
FIGS. 7A and 7B illustrate use of spare partitions in response to drive failure in the drive subset represented by FIG. 6B.
Figure 7B:
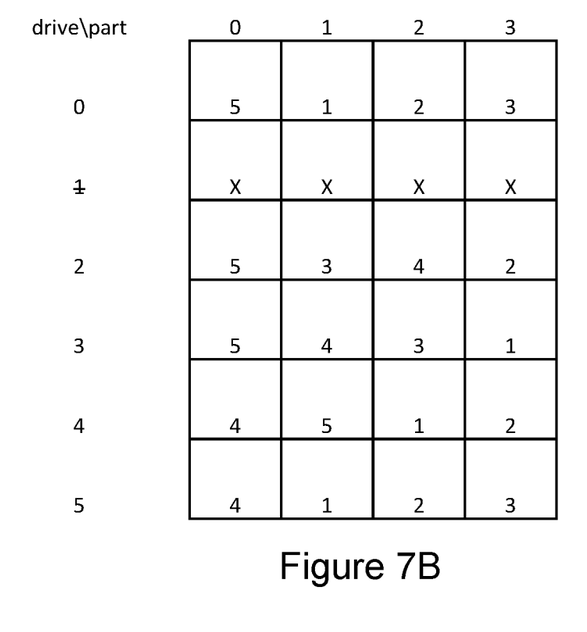

FIGS. 7A and 7B illustrate use of spare partitions in response to drive failure in the drive subset configuration shown in FIG. 6B. In the illustrated example drive 1 fails or is failing so the four protection group members on partitions 0-3 of drive 1 must be relocated or rebuilt. The protection groups members are relocated or rebuilt in the spare partitions such that no more than one member of a protection group is located on the same drive. The use of modulo arithmetic to distribute the protection group members and spares and the use of rotation to scale the drive subset by adding the new drive assures that at least one solution is available such no more than one member of a protection group is located on the same drive. If multiple solutions are available, then any one of those solutions may be implemented. In the illustrated example the member of protection group 5 at partition 0 of drive 1 is relocated or rebuilt in partition 1 of drive 4, the member of protection group 2 at partition 1 of drive 1 is relocated or rebuilt in partition 3 of drive 2, the member of protection group 3 at partition 2 of drive 1 is relocated or rebuilt in partition 2 of drive 3, and the member of protection group 4 at partition 3 of drive 1 is relocated or rebuilt in partition 0 of drive 5.

Figure 8A:
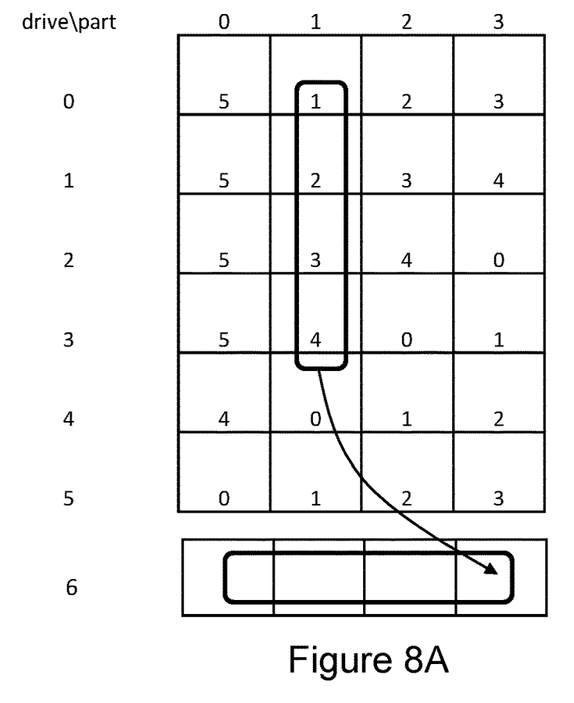
FIG. 8A illustrates selection and movement of protection group members to a second new drive added to the drive subset represented by FIG. 6B.

FIG. 8A illustrates selection and movement of protection group members to a second new drive added to the drive subset shown in FIG. 6B. The second new drive is sequentially numbered relative to existing drives 0-5 and is thus drive 6. The second new drive is formatted with the same number and size partitions as the existing drives and thus has (D+P)=4 partitions. The second new drive is populated by selecting the first (D+P) protection group members from the lowest numbered unrotated partition of the first (D+P) drives and rotating those protection group members into the (D+P) partitions of the second new drive such that the protection group member of the first drive/row is moved to the first partition/column of the second new drive, the protection group member of the second drive/row is moved to the second partition/column of the second new drive, the protection group member of the third drive/row is moved to the third partition/column of the second new drive, and so forth. Partition 1 is the lowest numbered unrotated partition and (D+P)=4 so the protection group members of partition 1 of drives 0-3 are rotated onto drive 6.

Figure 8B:
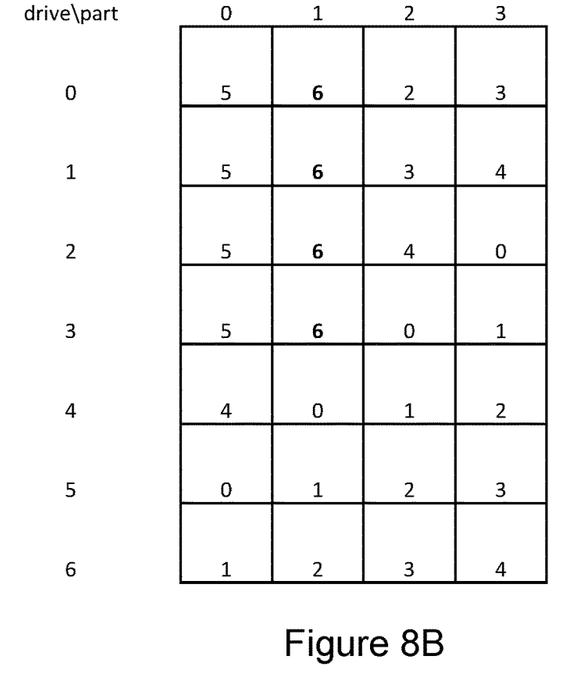
FIG. 8B illustrates creation of a new protection group using the partitions freed by movement of existing protection group members to the second new drive as shown in FIG. 8A.

FIG. 8B illustrates creation of a new protection group using the partitions freed by movement of existing protection group members to the second new drive as shown in FIG. 8A. The new protection group is sequentially numbered relative to the existing protection groups and includes the same number of members, i.e. (D+P). In the illustrated example the new protection group is assigned the number 6 and the members of protection group 6 are located in partition 1 of drives 0-3 which were made available by the rotation of protection group members 1, 2, 3, 4 to partitions 0-3 of second new drive 6 as described in the preceding paragraph.

Figure 9A:
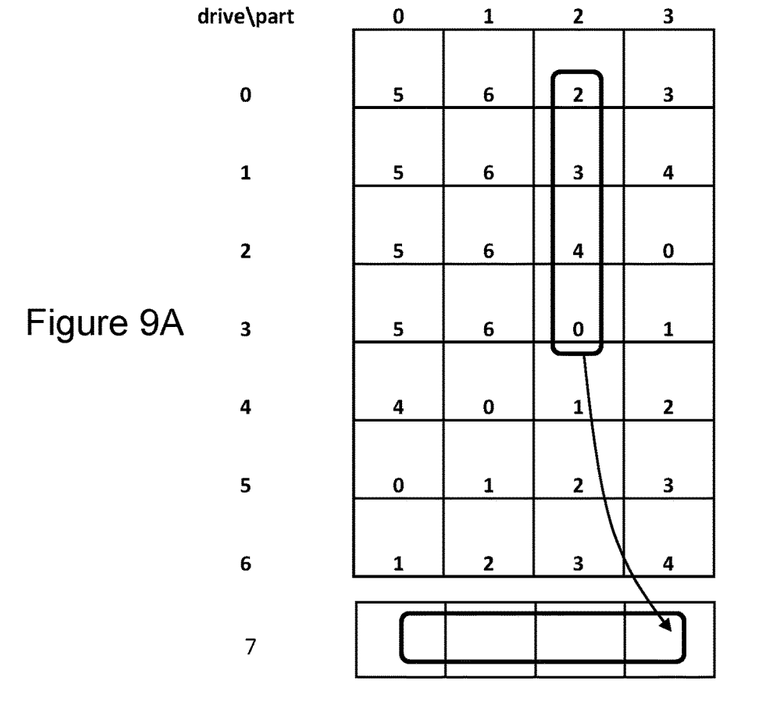
FIG. 9A illustrates selection and movement of protection group members to a third new drive added to the drive subset represented by FIG. 8B.

FIG. 9A illustrates selection and movement of protection group members to a third new drive added to the drive subset shown in FIG. 8B. The third new drive is sequentially numbered relative to existing drives 0-7 and is thus drive 7. The third new drive is formatted with the same number and size partitions as the existing drives and is populated by selecting the first (D+P) protection group members from the lowest numbered unrotated partition of the first (D+P) drives. Partition 2 is the lowest numbered unrotated partition so the first (D+P) protection group members in the third column/partition are rotated into the (D+P) partitions of the third new drive such that the protection group member of the first drive/row is moved to the first partition/column of the third new drive, the protection group member of the second drive/row is moved to the second partition/column of the third new drive, the protection group member of the third drive/row is moved to the third partition/column of the third new drive, and so forth.

Figure 9B:
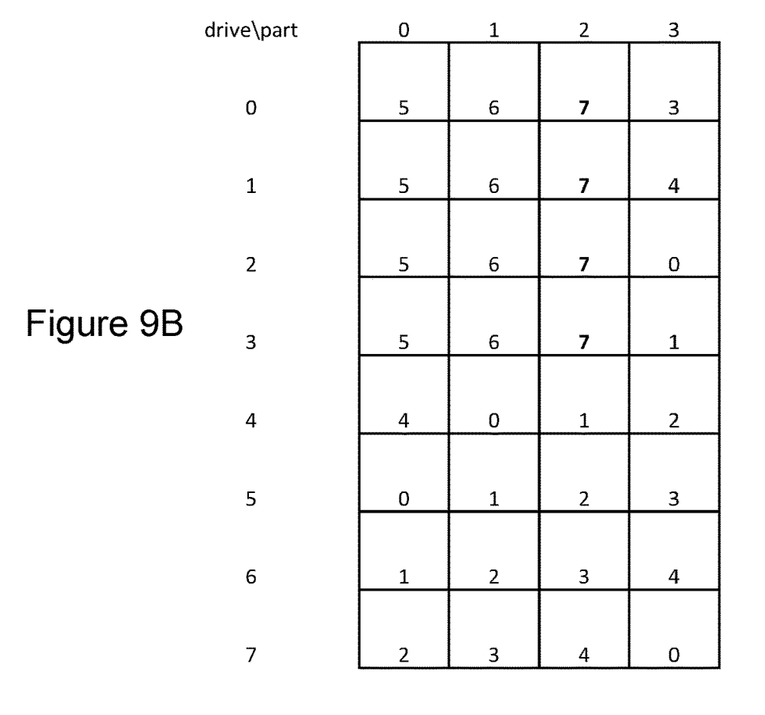
FIG. 9B illustrates creation of a new protection group using the partitions freed by movement of existing protection group members to the third new drive as shown in FIG. 9A.

FIG. 9B illustrates creation of a new protection group using the partitions freed by movement of existing protection group members to the third new drive as shown in FIG. 9A. The new protection group is sequentially numbered relative to the existing protection groups and includes the same number of members, i.e. (D+P). In the illustrated example the new protection group is assigned the number 7 and the members of protection group 7 are located in partition 2 of drives 0-3 which were made available by the rotation of protection group members 2, 3, 4, 0 to partitions 0-3 of third new drive 7 as described in the preceding paragraph.

Figure 10:
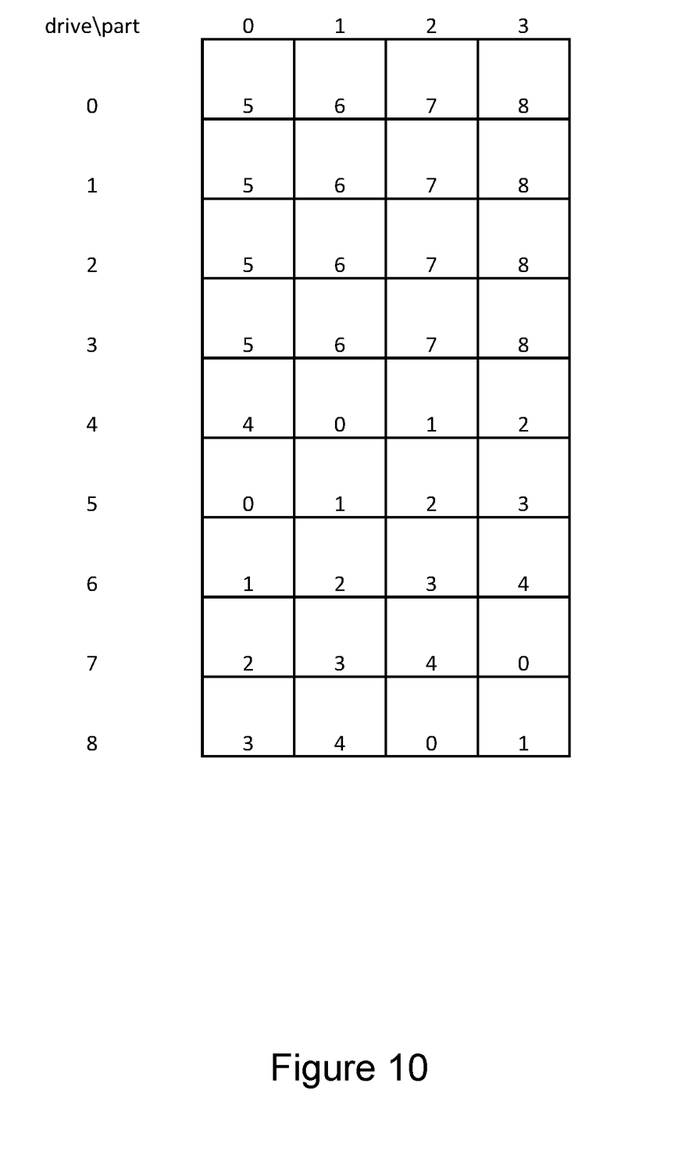
FIG. 10 illustrates a fully scaled version of the drive subset.

FIG. 10 illustrates a fully scaled version of the drive subset. A fourth new drive designated as drive 8 has been added and protection group members 3, 4, 0, 1 from partition 3 of drives 0-3 have been rotated onto drive 8. As a result, protection groups 5, 6, 7, 8 are oriented in single partitions of drives 0-3 and protection groups 0, 1, 2, 3, 4 are symmetrically distributed on drives 5-8. The drive set is fully scaled because it contains 2(D+P)+1 drives and is thus ready to be split as will be described below.

Figure 11:
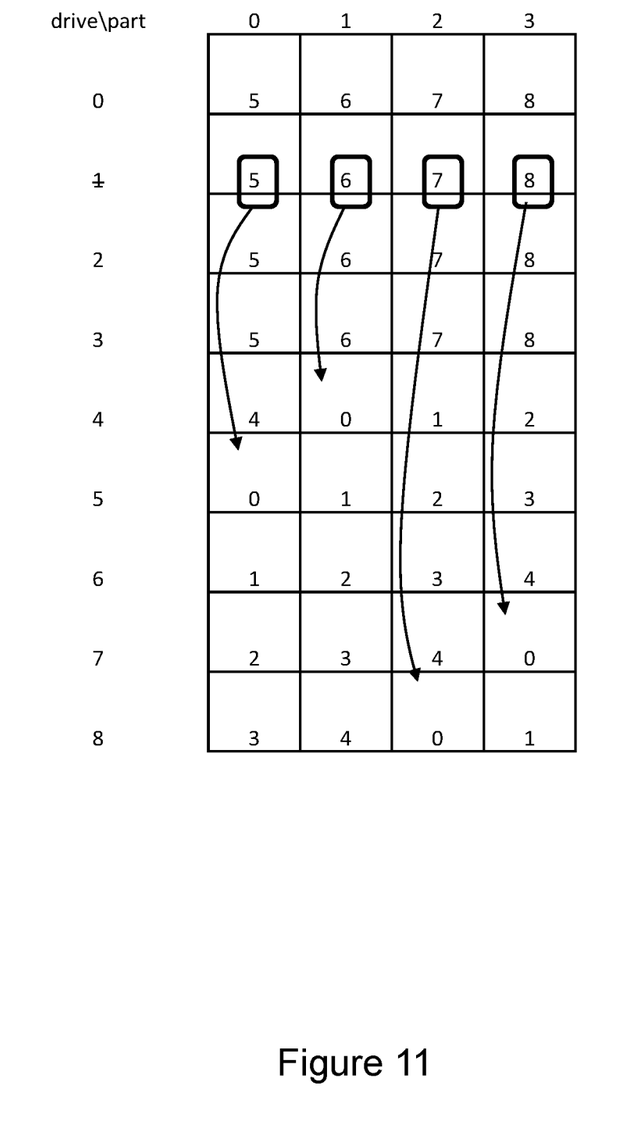
FIG. 11 illustrate use of spare partitions in response to drive failure in the drive subset represented by FIG. 10.

FIG. 11 illustrate use of spare partitions (protection group 0 members) in response to drive failure in the drive subset shown in FIG. 10. In the illustrated example drive 1 fails or is failing so the four protection group members 5, 6, 7, 8 on partitions 0-3 of drive 1 must be relocated or rebuilt. The protection groups members are relocated or rebuilt in the spare partitions such that no more than one member of a protection group is located on the same drive. The use of modulo arithmetic to distribute the protection group members and spares and the use of rotation to scale the drive subset by adding the new drive assures that at least one solution is available such no more than one member of a protection group is located on the same drive. If multiple solutions are available, then any one of those solutions may be implemented. In the illustrated example the member of protection group 5 at partition 0 of drive 1 is relocated or rebuilt in partition 0 of drive 5, the member of protection group 6 at partition 1 of drive 1 is relocated or rebuilt in partition 1 of drive 4, the member of protection group 7 at partition 2 of drive 1 is relocated or rebuilt in partition 2 of drive 8, and the member of protection group 8 at partition 3 of drive 1 is relocated or rebuilt in partition 3 of drive 7.

Figure 12:
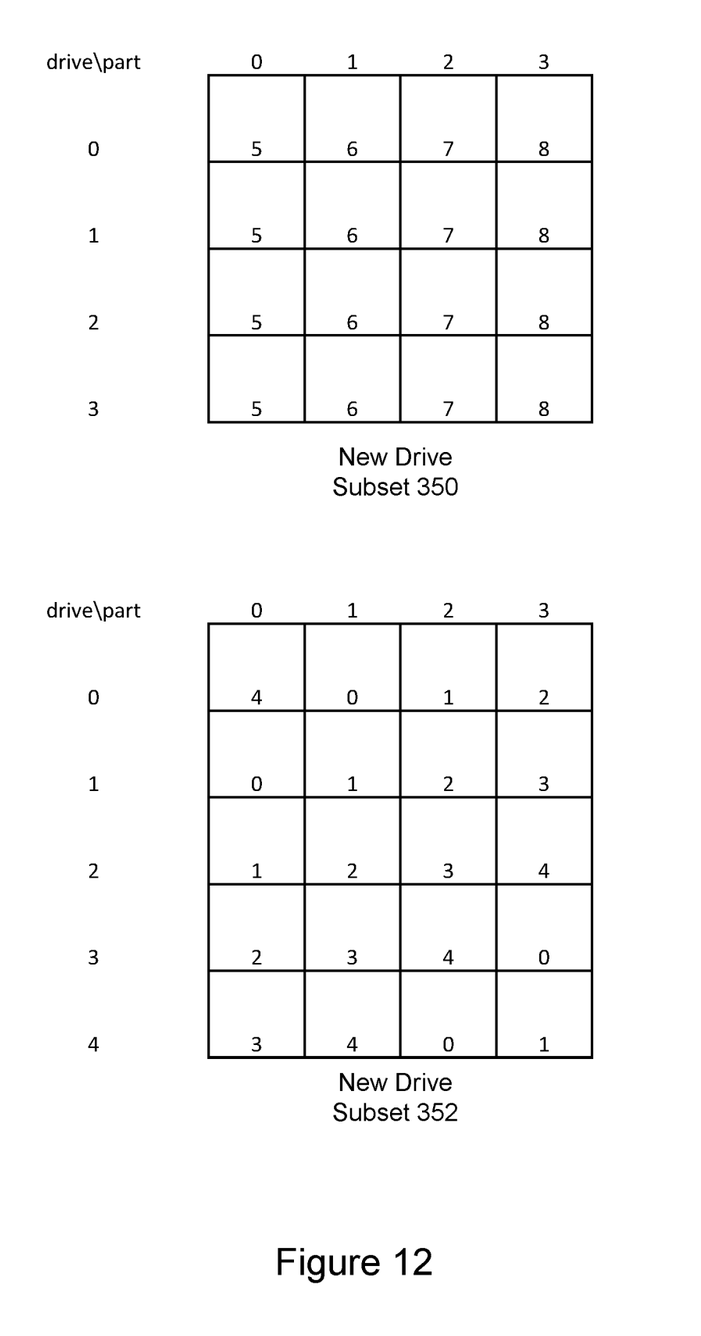
FIG. 12 illustrates splitting of the drive subset into two drive subsets.

FIG. 12 illustrates splitting of the fully scaled drive subset into two drive subsets. The (D+P) lowest numbered drives with protection groups located in single partitions are split to form a new drives subset 350. In the illustrated example drive subset 350 includes drives 0-3 with protection groups 5-8. The (D+P+1) higher numbered drives with symmetrically distributed protection groups and spares form a new drives subset 352. In the illustrated example drive subset 352 includes drives 4-8 (renumbered as drives 0-4) with protection groups 0-4. Drive subset 352 is pre-configured for scaling and recovery because the protection group members have been symmetrically distributed using modulo arithmetic and rotation as described above. Drive subset 350 can be configured for scaling and recovery by adding a spare drive and redistributing the protection group members and spares using modulo arithmetic and rotation as described above.

Figure 13:
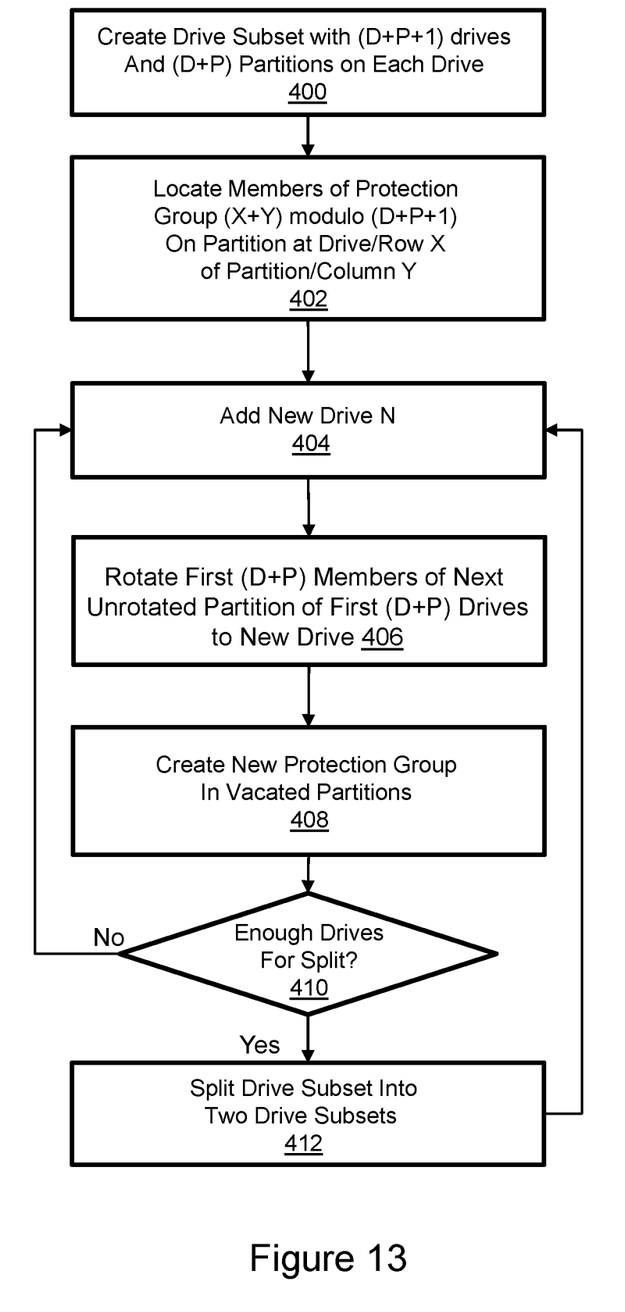
FIG. 13 illustrates a method for implementing protection groups on drive subsets with sparing, scaling, and splitting capabilities.

FIG. 13 illustrates a method for implementing protection groups on drive subsets with sparing, scaling, and splitting capabilities. Step 400 is creating a drive subset. In order to implement a drive subset with embedded sparing the drive subset is created with (D+P+1) drives and one protection group is reserved for spares. However, the drive subset could be created with (D+P) drives provided embedded sparing isn't desired. In either case the drive subset is created with (D+P) partitions on each drive. Step 402 is to locate the members of protection groups in partitions of the drive subset using modulo arithmetic. Each protection group has (D+P) members and the protection groups are sequentially numbered. The members of protection group (X+Y) modulo (D+P+1) are located on the partition at drive/row X of partition/column Y depending on whether reference is made to the drive subset or a matrix representation of the drive subset. Alternatively, members of protection group (X−Y) modulo (D+P+1) are located on the partition at drive/row X of partition/column Y. Step 404 is adding a new drive N. In some implementations new drives are added for N=1 to (D+P) but more than (D+P) new drives could be added. It is assumed for explanatory purposes that the new drives are added individually in single drive increments. Step 406 is rotating the first (D+P) protection group members of the lowest numbered unrotated partition of the (D+P) lowest numbered drives to the new drive. For example, for N=1, partitions numbered 0-3, (D+P)=4, and drives numbered 0-4, the members of partition 0 of drives 0-3 are rotated, whereas for N=2 the members of partition 1 of drives 0-3 are rotated. Members are rotated in ascending order by drive to locations in ascending order by partition. Step 408 is creating one or more new protection groups in the partitions made available due to rotation in step 406. Each new protection group is sequentially numbered relative to the existing protection groups in the drive subset. Step 410 is determining whether there are enough drives in the drive subset to enable a split. The minimum number of new drives N needed to enable a split is (D+P) so a split can occur when the drive subset includes 2*(D+P)+1 drives. If there are not enough drives in the drive subset to enable a split, then flow returns to step 404 and another new drive is added if and when desired. If there are enough drives in the drive subset to enable a split, then the drive subset is split into two drive subsets in step 412, resulting in a first drive subset of the (D+P) lowest numbered drives and a second drive subset of the (D+P+1) higher numbered drives. The first and second drive subsets resulting from the split have sequentially numbered drives and the drives with single-partition protection groups are split from the drives with symmetrically distributed protection groups. Specifically, the drive subset with symmetrically distributed protection groups has (D+P+1) drives and is already configured for scaling. Following the split the drive numbers are reassigned, e.g. drives 4-8 that are split into a new drive subset are renumbered as drives 0-4.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method, comprising:
    creating (D+P) partitions that are equal in size and number on (D+P+1) drives;
    creating protection groups that have D data members and P parity members by symmetrically distributing the protection group members on the partitions using modulo arithmetic;
    individually adding new drives with (D+P) partitions equal in size and number to the partitions of the (D+P) drives;
    for the first new drive:
        selecting (D+P) protection group members located on the first partition of the (D+P) drives;
        rotating the selected members as a column of a matrix to the new drive as a new row of the matrix; and
        creating a new protection group using freed space of the rotated members; and
    for each of the next new drives:
        selecting (D+P) protection group members located on an unrotated partition of the (D+P) drives;
        rotating the (D+P) selected protection group members from the unrotated partition to the new drive; and
        creating a new protection group using partitions freed by rotating the selected protection group members to the new drive.

2. The method of claim 1 wherein creating protection groups by symmetrically distributing the protection group members on the partitions using modulo arithmetic comprises creating (D+P) protection groups and a spare group of (D+P) spare partitions.

3. The method of claim 1 wherein symmetrically distributing the protection group members on the partitions using modulo arithmetic comprises locating members of protection group (X+Y) modulo (D+P+1) on the partition at drive X of partition Y.

4. The method of claim 1 wherein symmetrically distributing the protection group members on the partitions using modulo arithmetic comprises locating members of protection group (X-Y) modulo (D+P+1) on the partition at drive X of partition Y.

5. The method of claim 1 wherein selecting (D+P) protection group members comprises selecting the (D+P) protection group members from the lowest sequentially numbered unrotated partition of the (D+P) lowest sequentially numbered drives.

6. The method of claim 1 wherein rotating the selected protection group members to the new drive comprises rotating the (D+P) protection group members from the drives in ascending order to the partitions of the new drive in ascending order.

7. The method of claim 1 comprising splitting the drives into two independent groups when (D+P) new drives have been added.

8. An apparatus, comprising:
a plurality of non-volatile drives;
a plurality of interconnected compute nodes that manage access to the drives; and
a drive manager configured to:
create (D+P) partitions that are equal in size and number on (D+P+1) drives;
create protection groups that have D data members and P parity members by symmetrically distributing the protection group members on the partitions using modulo arithmetic;
individually add new drives with (D+P) partitions equal in size and number to the partitions of the (D+P) drives;
for each of the new drives:
select (D+P) protection group members located on an unrotated partition of the (D+P) drives;
rotate the (D+P) selected protection group members from the unrotated partition to the new drive; and
create a new protection group using partitions freed by rotating the selected protection group members to the new drive.

9. The apparatus of claim 8 wherein the drive manager creates (D+P) protection groups and a spare group of (D+P) spare partitions.

10. The apparatus of claim 8 wherein the drive manager locates members of protection group (X+Y) modulo (D+P+1) on the partition at drive X of partition Y.

11. The apparatus of claim 8 wherein the drive manager locates members of protection group (X−Y) modulo (D+P+1) on the partition at drive X of partition Y.

12. The apparatus of claim 8 wherein the drive manager selects the (D+P) protection group members from the lowest sequentially numbered unrotated partition of the (D+P) lowest sequentially numbered drives.

13. The apparatus of claim 8 wherein the drive manager rotates the (D+P) protection group members from the drives in ascending order to the partitions of the new drive in ascending order.

14. The apparatus of claim 8 wherein the drive manager splits the drives into two independent groups when (D+P) new drives have been added.

15. A non-transitory computer-readable storage medium storing instructions that when executed by a computer cause the computer to perform a method for using a computer system to scale a subset of drives, the method comprising:
creating (D+P) partitions that are equal in size and number on (D+P+1) drives;
creating protection groups that have D data members and P parity members by symmetrically distributing the protection group members on the partitions using modulo arithmetic;
individually adding new drives with (D+P) partitions equal in size and number to the partitions of the (D+P) drives;
for each of the new drives:
selecting (D+P) protection group members located on an unrotated partition of the (D+P) drives;
rotating the (D+P) selected protection group members from the unrotated partition to the new drive; and
creating a new protection group using partitions freed by rotating the selected protection group members to the new drive.

16. The non-transitory computer-readable storage medium of claim 15 wherein the method further comprises creating (D+P) protection groups and a spare group of (D+P) spare partitions.

17. The non-transitory computer-readable storage medium of claim 15 wherein the method further comprises locating members of protection group (X+Y) modulo (D+P+1) on the partition at drive X of partition Y.

18. The non-transitory computer-readable storage medium of claim 15 wherein the method further comprises locating members of protection group (X−Y) modulo (D+P+1) on the partition at drive X of partition Y.

19. The non-transitory computer-readable storage medium of claim 15 wherein the method further comprises selecting the (D+P) protection group members from the lowest sequentially numbered unrotated partition of the (D+P) lowest sequentially numbered drives.

20. The non-transitory computer-readable storage medium of claim 15 wherein the method further comprises rotating the (D+P) protection group members from the drives in ascending order to the partitions of the new drive in ascending order.

* * * * *